US012535385B2

(12) United States Patent
Cheve et al.

(10) Patent No.: US 12,535,385 B2
(45) Date of Patent: Jan. 27, 2026

(54) SENSOR MODULE FOR DETECTING A VIBRATIONAL BEHAVIOR OF A COMPONENT WITHOUT MEASURING NATURAL FREQUENCIES OF SAID SENSOR MODULE

(71) Applicant: Aktiebolaget SKF, Gothenburg (SE)

(72) Inventors: Olivier Cheve, Chanceaux-sur-choisille (FR); Charlotte Vu, Parçay Meslay (FR)

(73) Assignee: Aktiebolaget SKF, Gothenburg (SE)

( * ) Notice: Subject to any disclaimer, the term of this patent is extended or adjusted under 35 U.S.C. 154(b) by 349 days.

(21) Appl. No.: 18/455,743

(22) Filed: Aug. 25, 2023

(65) Prior Publication Data
US 2024/0077386 A1 Mar. 7, 2024

(30) Foreign Application Priority Data
Sep. 2, 2022 (DE) .......................... 102022209133.7

(51) Int. Cl.
*G01M 17/013* (2006.01)
*G01H 11/08* (2006.01)

(52) U.S. Cl.
CPC .......... *G01M 17/013* (2013.01); *G01H 11/08* (2013.01)

(58) Field of Classification Search
CPC ....... G01M 17/013; G01M 7/00; G01H 11/08
See application file for complete search history.

(56) References Cited

U.S. PATENT DOCUMENTS

| 9,849,893 | B2* | 12/2017 | Van Der Ham | ......... F16C 25/06 |
|---|---|---|---|---|
| 10,263,501 | B2* | 4/2019 | Yano | ...................... H02K 33/02 |
| 10,704,990 | B2* | 7/2020 | Cheve | ..................... G01M 7/00 |
| 2019/0154491 | A1* | 5/2019 | Bunner | ..................... B60Q 9/00 |
| 2019/0285513 | A1* | 9/2019 | Cheve | ..................... G01M 7/00 |
| 2024/0077383 | A1* | 3/2024 | Cheve | ..................... G01H 11/08 |

* cited by examiner

*Primary Examiner* — Freddie Kirkland, III
(74) *Attorney, Agent, or Firm* — Stinson LLP

(57) ABSTRACT

A sensor module (8) for detecting a mechanical vibration of a component (4). The sensor module (8) includes a base (12) having a central portion (24), a first end portion (26) and a second end portion (28). The base (12) secures to the component (4). At least one spacer (14) is connected to the base (12). A circuit board (18) is connected to the base (12) by the at least one spacer (14). The central portion (24) of the base (12) is provided with a concave edge (52) and with an opposite convex edge (54) defining the width of the central portion (24). The at least one spacer (14) is connected to the central portion (24) of the base (12) closer to the concave edge (52) than the convex edge (54).

18 Claims, 3 Drawing Sheets

SENSOR MODULE FOR DETECTING A VIBRATIONAL BEHAVIOR OF A COMPONENT WITHOUT MEASURING NATURAL FREQUENCIES OF SAID SENSOR MODULE

CROSS-REFERENCE TO RELATED APPLICATION

This application claims priority to German Application No. 102022209133.7, filed Sep. 2, 2022, the entirety of which is hereby incorporated by reference.

FIELD

The present disclosure generally relates to a sensor module for detecting a vibrational behavior of a mechanical component, and, more specifically, toward a sensor module for detecting a vibrational behavior of an annular bearing component of a vehicle wheel, which sensor module is mountable on the vehicle wheel and configured to wirelessly transmit signals indicative of the detected vibrational behavior.

BACKGROUND

Mechanical components are subjected to vibrations in various fields of technology. These vibrations may arise from the normal operation of a component or a machine or a system, but they could also indicate a defect or a failure of the component, machine or system. For example, vibrations occurring in rotating components, such as vehicle wheels, could indicate an imbalance or be indicative of bearing damage.

Regardless of whether the vibrations in question are related to normal operation or are indicative of a fault condition, there is a need to detect the vibrational behavior of such a component. Sensor modules can be used for this purpose, which sensor modules may include transmitters for wirelessly transmitting signals indicative of the detected vibrational behavior to a remote receiver.

Many factors must be taken into account when designing such sensor modules including, for example, easy integration, robustness of the module, reliability, and precision of vibration detection. A complex balancing of these factors must be performed to reach a compromise because maximizing one factor, such as robustness, may increase cost and/or decrease the ease of manufacture. Additionally, a bad manufacturing may force the sensor module to take into account the natural frequencies of said sensor module. Thus, it decreases the precision of the vibration detection by increasing the noise in the measure of the sensor module.

There is thus a need to provide a sensor module for detecting a vibrational behavior of a mechanical component that allows vibration detection without detecting too much natural frequencies.

SUMMARY

One object of the present disclosure is to provide a sensor module configured to detect a mechanical vibration of a component, the sensor module comprising:
  a base comprising a central portion, a first end portion and a second end portion, the base being configured to be secured on the component;
  at least one spacer connected to the base; and
  a circuit board having a first side facing the base and a second side facing away from the base, the circuit board being connected to the base by the at least one spacer.

Advantageously, the central portion of the base is provided with a concave edge and with an opposite convex edge defining the width of the central portion, the at least one spacer being connected to the central portion of the base closer to the concave edge than the convex edge.

The central portion being more rigid near the concave edge, the first and second spacers can better transmit the vibrations of the component, without adding too much noise due to the natural frequencies of the base in the signal measured by the sensor module.

In one embodiment, the at least one spacer is positioned at a distance from the concave edge comprised between 5% and 25% of the width of the central portion of the base.

In one embodiment, the at least one spacer is positioned at a distance from the concave edge equivalent to half of the width of the at least one spacer.

According to an embodiment, the circuit board comprises at least one hole inside which is engaged the at least one spacer.

Advantageously, the at least one spacer comprises a body portion having a first end and a second end spaced from the first end in a length direction, and a pin portion projecting from the second end of the body portion, the pin portion extending into the at least one hole and projecting outwardly from the second side of the circuit board, and the body portion being blocked from passing through the at least one hole by contact with a region of the first side of the circuit board surrounding the at least one hole.

According to an embodiment, the sensor module comprises a first spacer and a second spacer connected to the base, and comprises a first hole and a second hole inside which are respectively engaged the first spacer and the second spacer.

Advantageously, the circuit board comprises a piezoelectric vibration sensor.

In one embodiment, the piezoelectric vibration sensor is located equidistant from the first hole and the second hole.

Advantageously, the piezoelectric vibration sensor is located closer to the concave edge than the convex edge.

In one embodiment, the first end portion of the base comprises a first opening configured to cooperate with a first stud of the component, and the second end portion of the base comprises a second opening configured to cooperate with a second stud of the component.

Advantageously, the first end portion and the second end portion of the base lie in a same plane, the central portion being offset from said plane and connected to the first and second end portions by ramps.

One other object of the present disclosure is to provide a vehicle wheel assembly comprising:
  a wheel having a component comprising a first stud and a second stud adjacent to the first stud; and
  a sensor module as previously defined mounted on the wheel, the first end portion of the base being mounted on the first stud and the second end portion of the base being mounted on the second stud.

BRIEF DESCRIPTION OF THE DRAWINGS

Other advantages and features of the present disclosure will appear from the detailed description of an embodiment of the present disclosure, which is a non-limiting example, illustrated on the appended drawings of which.

DETAILED DESCRIPTION

Figure 1:
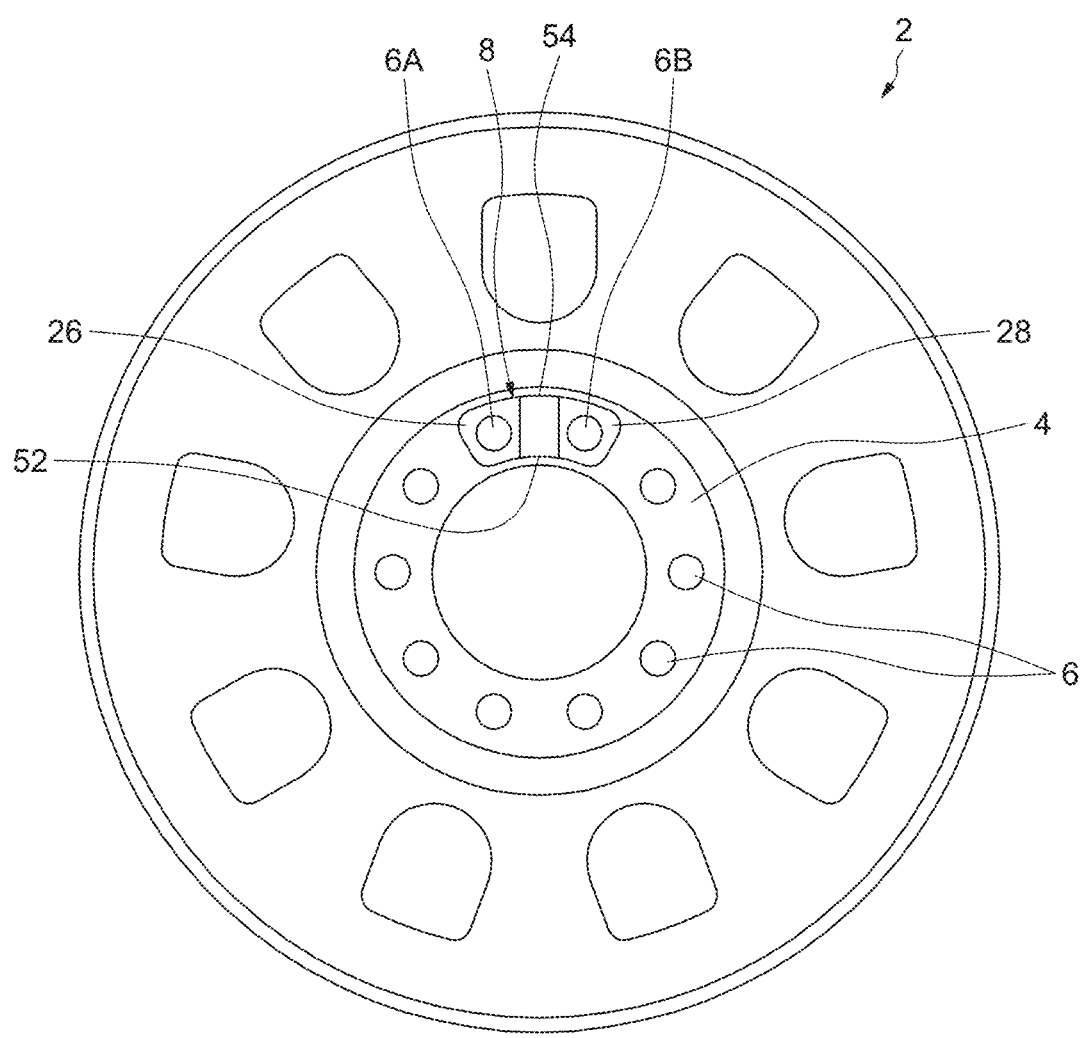
FIG. 1 is a schematic front view of a vehicle wheel assembly according to the present disclosure.

The FIG. 1 shows a vehicle wheel assembly 2 comprising a wheel having a component 4, for example a rim, comprising a plurality of studs 6 and a sensor module 8 mounted on a first stud 6A and a second stud 6B adjacent to the first stud 6A.

The sensor module 8 is configured to detect a mechanical vibration of the component 4. The detected mechanical vibration may be symptomatic of the vibrational behavior of an annular bearing component of the vehicle wheel assembly 2.

Figure 2:
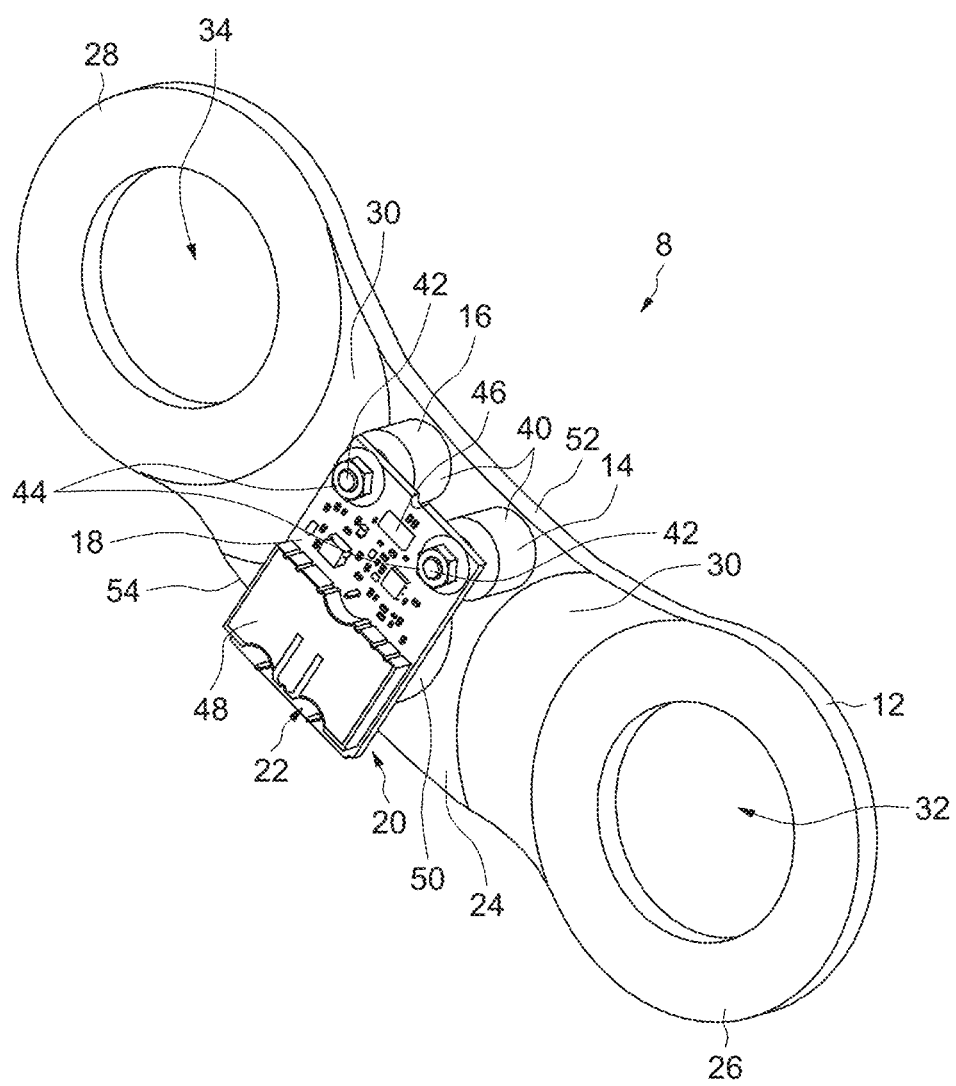
FIG. 2 is a view of a sensor module illustrated in FIG. 1 according to one embodiment.
Figure 3:
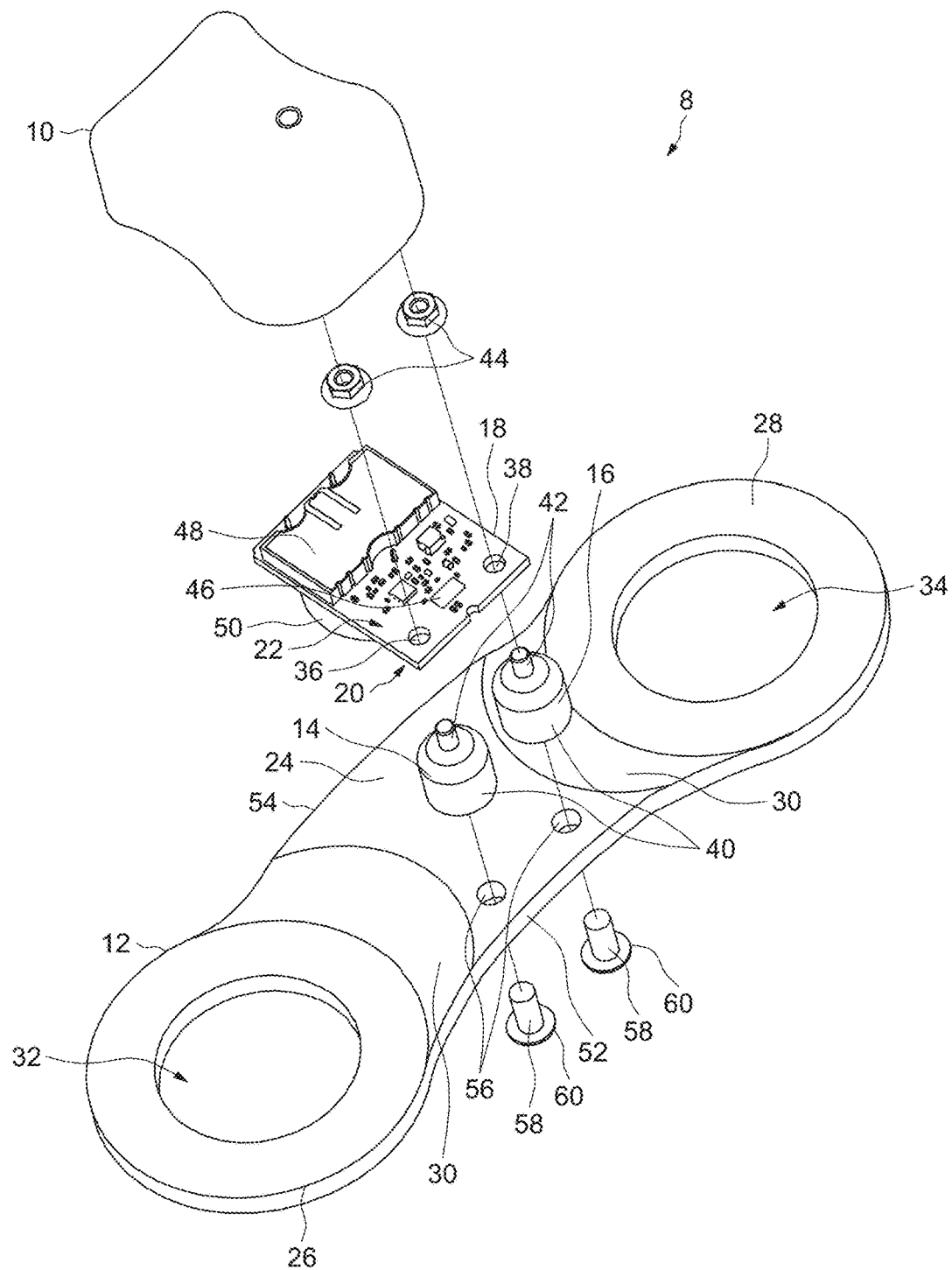
FIG. 3 is an exploded view of the embodiment illustrated in FIG. 2.

The FIGS. 2 and 3 show the sensor module 8 in greater detail. The FIG. 3 shows an exploded view of the sensor module 8, the sensor module comprising a cover 10 (not represented on the FIG. 2).

The sensor module 8 includes a base 12, a first spacer 14, a second spacer 16 and a circuit board 18 connected to the base 12 by the first and the second spacers 16 and 18. The first and second spacers 14, 16 are interposed between the circuit board 18 and the base 12. There is no direct contact between the circuit board 18 and the base 12.

The circuit board 18 comprises a first side 20 facing the base 12 and a second side 22 facing away from the base. The first and second sides 20, 22 define the thickness of the circuit board 18.

The base 12 comprises a central portion 24, a first end portion 26 and a second end portion 28. The first end portion 26 is connected to one end of the central portion 24 and the second end portion 28 is connected to one opposite end of the central portion. The first and second end portions 26, 28 lie substantially in a same plane. The central portion 24 of the base is offset from the plane of the first and second end portions 26, 28 and connected to these first and second end portions by ramps 30.

The first end portions 26, 28 of the base are configured to be secured on the component 4 (FIG. 1). To this end, the first end portion 26 of the base comprises a first opening 32 facing the first stud 6A, and the second end portion 28 comprises a second opening 34 facing the second stud 6B so that the sensor module 8 is secured to the component 4 with nuts (not illustrated) both engaged around the studs 6A, 6B.

The circuit board 18 comprises a first hole 36 and a second hole 38 inside which are respectively engaged the first spacer 14 and the second spacer 16. The first and second holes 36, 38 extend through the thickness of the circuit board 18. In a preferred embodiment, the first and second holes 36 and 38 are located along one edge of the circuit board 18.

The first and second spacers 14, 16 are interposed between the circuit board 18 and the central portion 24 of the base. Each spacer 14, 16 comprises a body portion 40 having a first end and a second end spaced from the first end in a length direction. The first end of the body portion 40 of each spacer 14, 16 is in contact with the central portion 24 of the base.

Each spacer 14, 16 also comprises a pin portion 42 projecting from the second end of the body portion 40, the pin portion 42 of each spacer 14 and 16 extending into each hole 36, 38 of the circuit board and projecting outwardly from the second side 22 of the circuit board. The pin portions 42 are secured on the second side 22 of the circuit board 18 by nuts 44. The body portion 40 is blocked from passing through the first and second holes 36, 38 by contact with a region of the first side 20 of the circuit board 18 surrounding the first and second holes 36 and 38.

The circuit board 18 also comprises a piezoelectric vibration sensor 46. Here, the piezoelectric vibration sensor 46 is mounted on the second side 22 of the circuit board. A vibration of the component is thus transmitted by the studs 6A and 6B, the base 12, and the spacers 14 and 16 to the piezoelectric vibration sensor 46. Advantageously, the piezoelectric vibration sensor 46 is located equidistant from the first spacer 14 and the second spacer 16 in order to measure the vibrations coming simultaneously from these spacers. More advantageously, the piezoelectric vibration sensor 46 is located between the holes 36, 38 in order to minimize the distance that vibrations must run from the spacers to the piezoelectric vibration sensor 46.

The circuit board 18 may also comprise a wireless transmitter and an antenna 48 mounted on the second side 22 of the circuit board 18. A battery 50 may also be mounted on the first side 20 of the circuit board 18.

The central portion 24 of the base 12 is provided with a concave edge 52 and with an opposite convex edge 54 defining the width of the central portion. The direction from the first opening 32 to the second opening 34 may be referred as the length of the base 12, the width of the central portion 24 being perpendicular to the length of the base 12 and configured to be aligned with a radius of the vehicle wheel assembly 2.

This design lets appear higher natural frequencies of the base 12 near the concave edge 52 than near the convex edge 54. The zone near the concave edge 52 is thus more rigid than the zone near the convex edge 54.

The first spacer 14 and the second spacer 16 are connected to the central portion 24 of the base 12 closer to the concave edge 52 than the convex edge 54. The central portion 24 being more rigid near the concave edge 52, the first and second spacers 14 and 16 can better transmit the vibrations of the component 4, without adding too much noise due to the natural frequencies of the base 12.

In a preferred embodiment, the first and second spacers 14 and 16 are positioned at a distance from the concave edge 52 comprised between 5% and 25% of the width of the central portion 24 of the base 12.

In one particular embodiment, the first and second spacers 14, 16 are positioned at a distance from the concave edge 52 equivalent to half of the width of the spacers 14, 16, so that the spacers 14, 16 are as close as possible from the concave edge 52 without overflowing from the surface delimited by the base 12.

The first spacer 14 and the second spacer 16 are connected to the central portion 24 while being located equidistant from the openings 32, 34. The central portion 24 also includes a first and second apertures 56 along the concave edge 52 in order to connect the first and second spacers 14, 16 to the base 12 by inserting threaded fasteners 58 in the first and second apertures 56 and through the first and second spacers 14 and 16. The threaded fasteners 58 of the sensor module 8 comprise a head 60 being located in the gap formed by the offset of the central portion 24 of the base 12 relative to the component 4 of the vehicle wheel assembly 2.

What is claimed is:

1. A sensor module configured to detect a mechanical vibration of a component, the sensor module comprising:

a base comprising a central portion, a first end portion and a second end portion, the base being configured to be secured on the component;

at least one spacer connected to the base; and a circuit board having a first side facing the base and a second side facing away from the base, the circuit board being connected to the base by the at least one spacer;

wherein the central portion of the base is provided with a concave edge and with an opposite convex edge defining the width of the central portion, the at least one spacer being connected to the central portion of the base closer to the concave edge than the convex edge.

2. The sensor module according to claim 1, wherein the at least one spacer is positioned at a distance from the concave edge comprised between 5% and 25% of the width of the central portion of the base.

3. The sensor module according to claim 2, wherein the at least one spacer is positioned at a distance from the concave edge equivalent to half of the width of the at least one spacer.

4. The sensor module according to claim 1, wherein the circuit board comprises at least one hole inside which is engaged the at least one spacer.

5. The sensor module according to claim 4, wherein the at least one spacer comprises a body portion having a first end and a second end spaced from the first end in a length direction, and a pin portion projecting from the second end of the body portion, the pin portion extending into the at least one hole and projecting outwardly from the second side of the circuit board, and the body portion being blocked from passing through the at least one hole by contact with a region of the first side of the circuit board surrounding the at least one hole.

6. The sensor module according to claim 4, comprising a first spacer and a second spacer connected to the base, and comprising a first hole and a second hole inside which are respectively engaged the first spacer and the second spacer.

7. The sensor module according to claim 6, wherein the circuit board comprises a piezoelectric vibration sensor located equidistant from the first hole and the second hole.

8. The sensor module according to claim 1, wherein the first end portion of the base comprises a first opening configured to cooperate with a first stud of the component, and wherein the second end portion of the base comprises a second opening configured to cooperate with a second stud of the component.

9. The sensor module according to claim 1, wherein the first end portion and the second end portion of the base lie in a same plane, the central portion being offset from said plane and connected to the first and second end portions by ramps.

10. The sensor module according to claim 2, wherein the at least one spacer is positioned at a distance from the concave edge equivalent to half of the width of the at least one spacer.

11. The sensor module according to claim 10, wherein the circuit board comprises at least one hole inside which is engaged the at least one spacer.

12. The sensor module according to claim 11, wherein the at least one spacer comprises a body portion having a first end and a second end spaced from the first end in a length direction, and a pin portion projecting from the second end of the body portion, the pin portion extending into the at least one hole and projecting outwardly from the second side of the circuit board, and the body portion being blocked from passing through the at least one hole by contact with a region of the first side of the circuit board surrounding the at least one hole.

13. The sensor module according to claim 12, comprising a first spacer and a second spacer connected to the base, and comprising a first hole and a second hole inside which are respectively engaged the first spacer and the second spacer.

14. The sensor module according to claim 13, wherein the circuit board comprises a piezoelectric vibration sensor located equidistant from the first hole and the second hole.

15. The sensor module according to claim 14, wherein the first end portion of the base comprises a first opening configured to cooperate with a first stud of the component, and wherein the second end portion of the base comprises a second opening configured to cooperate with a second stud of the component.

16. The sensor module according to claim 15, wherein the first end portion and the second end portion of the base lie in a same plane, the central portion being offset from said plane and connected to the first and second end portions by ramps.

17. A vehicle wheel assembly comprising:
a wheel having a component comprising a first stud and a second stud adjacent to the first stud; and
a sensor module according to claim 16 mounted on the wheel, the first end portion of the base being mounted on the first stud and the second end portion of the base being mounted on the second stud.

18. A vehicle wheel assembly comprising:
a wheel having a component comprising a first stud and a second stud adjacent to the first stud; and
a sensor module according to claim 1 mounted on the wheel, the first end portion of the base being mounted on the first stud and the second end portion of the base being mounted on the second stud.

* * * * *